United States Patent [19]

Nikles

[11] Patent Number: 5,112,912
[45] Date of Patent: May 12, 1992

[54] PROCESS FOR MODIFYING ACRYLATE COPOLYMERS

[75] Inventor: Erwin Nikles, Praroman, Switzerland

[73] Assignee: Ciba-Geigy Corp., Ardsley, N.Y.

[21] Appl. No.: 697,511

[22] Filed: Apr. 29, 1991

Related U.S. Application Data

[63] Continuation of Ser. No. 494,030, Mar. 15, 1990, abandoned.

[30] Foreign Application Priority Data

Mar. 21, 1989 [CH] Switzerland .......... 1035/89

[51] Int. Cl.$^5$ .................. C08F 8/30
[52] U.S. Cl. .................. 525/123; 525/327.3; 525/375; 525/376
[58] Field of Search .......... 525/123, 375, 376, 327.3

[56] References Cited

U.S. PATENT DOCUMENTS

| | | | |
|---|---|---|---|
| 3,759,733 | 9/1973 | Bradley et al. | 106/309 |
| 3,776,749 | 12/1973 | McKay et al. | 106/288 |
| 4,495,325 | 1/1985 | DeBargales et al. | 525/123 |
| 4,727,158 | 2/1988 | Seltzer et al. | |
| 4,775,797 | 10/1988 | Slongo et al. | |
| 4,785,063 | 11/1988 | Slongo et al. | |
| 4,847,367 | 7/1989 | Seltzer et al. | |
| 4,853,471 | 8/1989 | Rody et al. | |
| 4,880,859 | 11/1989 | Sleego et al. | 524/91 |
| 4,894,399 | 1/1980 | Raley et al. | 324/91 |
| 4,921,966 | 5/1990 | Stegmann et al. | 548/260 |
| 4,926,190 | 5/1990 | Leaver | 346/1.1 |

FOREIGN PATENT DOCUMENTS 981539 1/1965 United Kingdom .

OTHER PUBLICATIONS

Chem. Abst. of JP-63-145,411.
Chem. Abst. of JP-61-023,628.

*Primary Examiner*—Bernard Lipman
*Attorney, Agent, or Firm*—JoAnn Villamizar

[57] ABSTRACT

Acrylate copolymers which contain groups are reacted with a 2-hydroxphenylbenzotriazole which contains a carboxyl group. A permanent light stabilization of the acrylate copolymers is thereby achieved. The modified acrylate resins so obtained are particularly suitable for use as binders for coating materials.

12 Claims, No Drawings

PROCESS FOR MODIFYING ACRYLATE COPOLYMERS

This application is a continuation of application Ser. No. 494,030, filed Mar. 15, 1990 now abandoned.

The present invention relates to a process for the modification of acrylate copolymers by incorporating 2-hydroxyphenylbenzotriazoles, and to the use of the modified polymers so obtained as binders for coating materials.

The proposal has already been made to incorporate UV absorbers of the benzotriazole type in condensation polymers such as polyesters or polyamides. This is done by using benzotriazole derivatives containing carboxyl, hydroxyl or amino groups which are able to react with the carboxyl, hydroxyl or amino groups of the polyester or polyamide components. Reference is made in this connection to German Offenlegungsschrift 1 495 870 (=GB patent specification 981 539). Such benzotriazole derivatives are incorporated in the polymer chain or at the chain end of the polyesters or polyamides. The advantage compared with the physical addition of UV absorbers in the permanence of the effect obtained. The chemically incorporated UV absorbers are not lost as a result of elution or migration. The drawback of incorporation in the polymer is a certain reduction of the molecular weight of the polyesters or polyamides.

In recent years, the light stabilisation of coating materials has attained considerable importance. In this sector too it is desirable that the stabilisation should be of good permanence. This requirement applies in particular to automotive lacquers. Automotive finishing lacquers are normally multilayer systems in which the UV absorber shall be effective in the topmost layer (finishing coat) in which, naturally, loss caused by elution and migration is also highest. As such automotive finishing lacquers often contain acrylic resins as binders, it is of interest to provide acrylic resins in which UV absorbers are incorporated.

A suitable means of achieving this end is the copolymerisation of a saturated derivative of a light stabiliser with the acrylate monomers. Copolymerisable derivatives of benzotriazoles suitable for this purpose are disclosed in European patent application 0 133 164. However, a copolymerisation of this kind entails problems, because many light stabilisers react with radicals and thereby interfere with the polymerisation.

The present invention, however, starts from finished acrylate copolymers and introduces a light stabiliser radical by reaction with the copolymer. This reaction hence takes the form of a modification of an acrylate copolymer by the introduction of a UV absorbing radical into a side group.

Specifically, the present invention relates to a process for modifying acrylate copolymers by reacting a copolymer of glycidyl acrylate and/or glycidyl methacrylate and one or more alkyl acrylates or methacrylates and, if appropriate, styrene, (a) with a compound of formula I

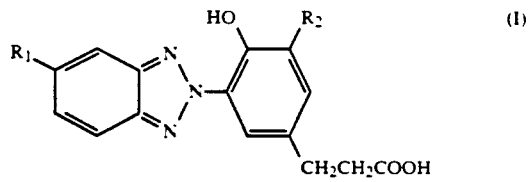

wherein $R_1$ is hydrogen or chloro and $R_2$ is $C_1$–$C_{12}$alkyl, and in an optional additional step (b) with a compound which contains an active hydrogen atom.

Copolymers of glycidyl (meth)acrylate and alkyl (meth)acrylates and, if appropriate, styrene, can be prepared by copolymerisation of the components in the presence of a radical initiator. Suitable initiators are typically organic peroxides or azo compounds which decompose into radicals when heated. The copolymerisation can be carried out in the presence or absence of solvents and is initiated by raising the temperature.

Illustrative examples of acrylate and methacrylate comonomers are methyl (meth)acrylate, ethyl (meth)acrylate, isopropyl (meth)acrylate, butyl (meth)acrylate, hexyl (meth)acrylate, octyl (meth)acrylate, decyl (meth)acrylate or dodecyl (meth)acrylate. (Meth)acrylates in which the alkyl moieties contain 1 to 12, preferably 1 to 8, carbon atoms, are preferred. Alkyl groups of 2 to 8 carbon atoms can be interrupted by oxygen atoms and/or substituted by hydroxyl groups.

The ratio of glycidyl (meth)acrylate to alkyl (meth)acrylate and, if appropriate, styrene, may vary within a wide range. It is preferred to use copolymers containing 10–50 mol % of glycidyl (meth)acrylate.

The compounds of formula I are known compounds. They may be prepared, for example, by the process disclosed in European patent application 0 57 160 and are UV absorbers. $R_2$ as $C_1$–$C_{12}$alkyl may be methyl, ethyl, isopropyl, n-propyl, sec-butyl, n-butyl, tert-butyl, sec-pentyl, n-hexyl, sec-hexyl, n-octyl, tert-octyl, n-decyl, sec-dodecyl or n-dodecyl. Preferably $R_2$ is $C_1$–$C_5$alkyl, most preferably methyl or tert-butyl. It is preferred to use a compound of formula I, wherein $R_1$ is hydrogen and $R_2$ is tert-butyl.

The reaction of the copolymer with the compound of formula I is preferably carried out in solution. Illustrative examples of suitable solvents are benzene, toluene, xylene, tetrahydrofuran or dioxane.

Preferably 0.01 to 1 mol, most preferably 0.1 to 1 mol, of the compound of formula I is used per mol of glycidyl groups. If it is desired to react all the glycidyl groups of the copolyacrylate, then 1 mol of the compound of formula I is used per mol of glycidyl groups. It is, however, also possible to use less compound of formula I, in which case the products obtained still contain glycidyl groups and can be reacted with other reactants which contain an active hydrogen atom, for example carboxylic acids, alcohols, phenols, mercaptans, amines and amides, which reactants may also be difunctional. In a preferred process, 0.1 to 0.5 mol of the compound of formula I is used per mol of glycidyl groups, and any remaining glycidyl groups, or a part thereof, are reacted with unsaturated fatty acid or with a mixture of fatty acids containing unsaturated fatty acids, to give products which cure in the air similar to an alkyd resin.

The reaction of the copolyacrylate with the compound of formula I is preferably carried out in the temperature range from 60°–120° C. The reaction can be followed analytically, for example by determining the acid number or epoxy value. In this reaction, a β-hydroxy ester is obtained according to the scheme:

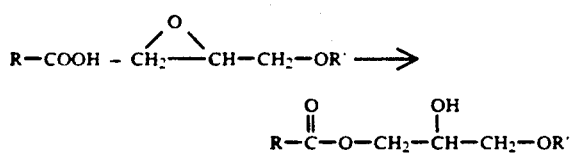

The modified acrylate resins can therefore be crosslinked with crosslinking agents which react with OH groups. Suitable crosslinking agents of this kind are preferably melamine resins and polyisocyanates.

If the modified acrylate resin still contains residual glycidyl groups, then the resin can be crosslinked with those crosslinking agents which react with epoxy groups. Such groups are typically polyamines, polyamino-amides, di- and polycarboxylic acid anhydrides or polymers containing carboxylic acid or carboxylic acid anhydride groups.

For crosslinking it is also possible to use the catalysts which are suitable for the catalytic curing of epoxy resins.

There are thus different possibilities of crosslinking the modified acrylate copolymers. Hence the modified polymers are very suitable binders for coating materials, especially finishing lacquers for automative finishes.

The coating materials prepared therefrom may be pigmented or unpigmented and are preferably unpigmented. They may contain the additional modifiers conventionally used in coating technology, for example stabilisers, plasticisers, flow control agents, thixotropic agents or curing catalysts.

The following Examples illustrate the invention in more detail, without implying any restriction to what is desribed therein. Parts and percentages are by weight, unless otherwise indicated. Mn and Mw will be understood as meaning the number average or weight average of the molecular weight.

EXAMPLE 1

With stirring, a mixture of 121 g of methacrylate, 242 g of butyl methacrylate and 252 g of glycidyl methacrylate and a solution of 12 g of azoisobutyronitrile in 200 ml of toluene are simultaneously added dropwise, under nitrogen, at 105° C. over 3 hours to 550 ml of dry toluene. The clear solution is then refluxed for 1 hour. The molecular weight of the resultant copolymer is determined by gel permeation chromatography in tetrahydrofuran: Mn=7 600, Mw=18 600.

At 100° C., 516 g of 2-[2-hydroxy-3-tert-butyl-5-(2-carboxyethyl)phenyl]-benzotriazole are added to the above copolymer solution, and the initial suspension is refluxed for 24 hours. Analysis by thin-layer chromatography shows that only traces of the carboxylic acid are still present in the resultant clear solution. The viscous solution has a solids content of 63.70%. The molecular weight of the modified copolymer is Mn=18 100, Mw=33 600.

This solution is mixed in the ratio 3:2 (based on the solids content) with Cymel® (ex Cyanamide) and to the mixture is added 0.8% of p-TSA (based on the solids content of the mixture). This mixture is aplied with a doctor blade to a white coil-coated aluminium sheet and stoved at 80° C. for 45 minutes to give a dry film thickness of 40 μm. After stoving, the coating is cured and has a sufficient hardness (pendulum hardness of 55 seconds according to DIN 53 157).

The viscous solution prepared above is mixed in the ratio 2.9:1 with Desmodur® 3390 (ex Bayer) in place of Cymel®, and applied with a doctor blade to a white coil-coated aluminium sheet. The lacquer is non-marring. The dry film thickness is ca. 40 μm.

EXAMPLE 2

A copolymer of methyl, butyl and glycidyl methacrylate in toluene is prepared as decribed in Example 1. Then 747 g of the copolymer solution are mixed with 206 g of 2-[2-hydroxy-3-tert-butyl-5-(2-carboxyethyl)-phenyl]benzotriazole and the mixture is refluxed for 6 hours. Then 85.5 g of a technical fatty acid mixture containing 55% of linoleic acid and 35% of oleic acid are added and the solution is refluxed for a further 24 hours. A resin solution having a solids content of 63% is obtained.

To this resin solution is added 2% (based on resin solids) of a curing accelerator (Octasoligen®, ex. Gebr. Borchers AG) and the solution is applied to pine-wood (10 cm × 30 cm × 1.5 cm) (sample 1). For comparison purposes, a similar sample is prepared without curing accelarator (sample 2). Both samples are exposed facing south in the Basle area below 45° and subjected to weather for 12 months. The following results are obtained:

TABLE 1

| Sample | 60° gloss after | | % gloss retention after 12 months |
|---|---|---|---|
| | 0 months | 12 months | |
| 1 | 74 | 62 | 84 |
| 2 | 53 | 37 | 70 |

The low initial gloss and the low gloss retention after 12 months of the comparison sample 2 shows that the coating without curing accelerator exhibits no crosslinking. The results obtained for sample 1 show that the high concentration of UV absorber does not impair the efficacy of the curing accelerator.

EXAMPLE 3

The modified resin solution obtained in Example 1 is mixed with a melamine resin (Resimene® 755, ex Monsanto Co.) in a solids ratio of 3:2 and to the mixture is added 0.4% (based on total solids) of p-toluenesulfonic acid. The lacquer so obtained is applied with a doctor blade to a white coil-coated aluminium sheet and stoved for 30 minutes at 120° C. A clear lacquer finish having a dry film thickness of 40 μm is obtained.

The sample is subjected to accelerated weathering in a UVCON® weathering device supplied by Atlas Corp., at a cycle of 8 h UV irradiation at 70° C. and 4 h condensation at 50° C. In this test, the sample has an extremely pronounced resistance to weathering. Crack formation is not observed until after 20 000 hours exposure to weathering. Gloss retention after this time (20° gloss) is 67%.

EXAMPLES 4–10

180 ml of toluene are heated to 120° C. Under nitrogen and with stirring, the mixtures of monomers and a solution of azoisobutyronitrile in toluene are added dropwise at this temperature, beginning simultaneously. The addition of the monomer mixture is made over 3 hours, that of the catalyst solution over 3½ hours. The mixture is then refluxed for 1 hour. Then 2-[2-hydroxy-3-tert-butyl-5-(2-carboxyethyl)phenyl]-benzotriazole or the 5-chloro derivative thereof is added dropwise and the mixture is refluxed for a further 24 hours. The solutions of the polymers are diluted with 500 ml of toluene, filtered over 200 g of silica gel, and then concentrated by evaporation under vacuum to the desired solids content. The polymers are characterised by determining the molecular weights by gel permeation chromatography.

ing on the amounts, partial or complete reaction of the epoxy groups is obtained:

| Example 12 | 0.2 g | of acetic acid |
| Example 13 | 0.3 g | of isobutyric acid |
| Example 14 | 1.0 g | of stearic acid |
| Example 15 | 1.35 g | of Versatic ® 10 (Shell Chem. Co.) |
| Example 16 | 0.3 g | of suberic acid (reaction without catalyst, refluxed for 4 hours) |

TABLE 2

| Ex. | Monomer [g] | Catalyst | BT 1* | Mn | Mw |
|---|---|---|---|---|---|
| 4 | 10.1 ethyl acrylate<br>20.2 methyl methacrylate<br>14.4 n-butyl methacrylate<br>29.9 glycidyl methacrylate | 1.8 g in<br>25 ml toluene | 67.9 g | 14614 | 23321 |
| 5 | 28.2 2-ethylhexyl acrylate<br>30.3 methyl methacrylate<br>18.0 ethyl methacrylate<br>44.9 glycidyl methacrylate | 2.4 g in<br>65 ml toluene | 91.6 g | 10751 | 22573 |
| 6 | 14.4 2-ethoxy ethylacrylate<br>20.2 methyl methacrylate<br>28.8 n-butyl methacrylate<br>44.9 glycidyl methacrylate | 2.2 g in<br>50 ml toluene | 91.6 g | 13789 | 23574 |
| 7 | 42.1 styrene<br>10.1 methyl methacrylate<br>14.4 butyl methacrylate<br>44.9 glycidyl methacrylate | 2.4 g in<br>60 ml toluene | 95.0 g | 13463 | 25110 |
| 8 | 24.3 methyl methacrylate<br>48.5 butyl methacrylate<br>50.6 glycidyl methacrylate | 2.4 g in<br>40 ml toluene | 57.4 g | 15202 | 27472 |
| 9 | 20.2 methyl methacrylate<br>43.1 butyl methacrylate<br>41.6 glycidyl acrylate | 2.2 g in<br>35 ml tolene | 91.6 g | 11019 | 22735 |
| 10 | 16.2 methyl methacrylate<br>32.3 n-butyl methacrylate<br>33.7 glycidyl methacrylate | 1.8 g in<br>40 ml toluene | 75.7 g<br>BT 2** | 13818 | 23286 |

*BT 1 = 2-[2-hydroxy-3-tert-butyl-5-(2-carboxyethyl)phenyl]benzotriazole
**BT 2 = 2-[2-hydroxy-3-tert-butyl-5-(2-carboxyethyl)-5-chlorophenyl]benzotriazole

EXAMPLE 11

The procedure of Example 1 is repeated, except that only ⅔ of the amount of 2-[2-hydroxy-3-tert-butyl-5-(2-carboxyethyl)phenyl]benzotriazole are used. The resultant solution of the polymer is adjusted to a solids content of 60.4%.

EXAMPLES 12-16

To 10 g of the solution obtained according to Example 11 are added the amounts indicated below of a carboxylic acid and 0.05 g of tetrabutylammonium bromide, and the mixture is refluxed for 16 hours. Depend- Similar products can be obtained by preparing, in accordance with Example 1, polymers from methyl methacrylate, butyl methacrylate and glycidyl methacrylate with the same amounts of the above carboxylic acids and only then reacting these polymers with 2-[2-hydroxy-3-tert-butyl-5-(2-carboxyethyl)phenyl]benzotriazole.

EXAMPLES 17-25

10 g of the solution obtained according to Example 11 are reacted with the following reagents such that, depending on the amounts, partial or complete reaction of the epoxy groups present in the polymer is obtained. The solvent and excess reagents are removed by distillation, in some cases under vacuum or high vacuum.

TABLE 3

| EX. | Catalyst | Reagent | Additional solvent | Reaction conditions |
|---|---|---|---|---|
| 17 | 0.1 ml 48% BF₃ etherate | 126 ml methanol | 100 ml of dry toluene | 48 hours room temperature |
| 18 | 0.1 ml 48% BF₃ etherate | 123 ml 1-butanol | 100 ml dry toluene | 48 hours room temperature |
| 19 | 0.1 ml 48% BF₃ etherate | 100 g 1-octadecanol | 100 ml dry toluene | 48 hours 30–40° C. |
| 20 | 0.1 ml 48% BF₃ etherate | 100 g methoxy ethanol | 100 ml dry toluenel | 48 hours room temperature |
| 21 | 0.1 ml 48% BF₃ etherate | 100 ml cyclohexanol | 100 ml dry toluene | 48 hours room temperature |
| 22 | 0.1 ml 48% BF₃ etherate | 100 g phenol | 100 ml dry toluene | 48 hours room temperature |
| 23 | 0.1 ml 48% BF₃ etherate | 100 g benzyl alcohol | 100 ml drys toluene | 48 hours room temperature |
| 24 | — | 0.21 g benzyl mercaptan | — | 16 hours reflux |

TABLE 3-continued

| EX | Catalyst | Reagent | Additional solvent | Reaction conditions |
|---|---|---|---|---|
| 25 | — | 0.13 g n-butylamine | — | 30 minutes 100° C. |
| 26 | 1 drop 1-n HCl | 1.7 g hexamethylol-melamine hexamethyl ether | — | 1 hour reflux |

EXAMPLE 27

36 g of methyl pentyl ketone are heated to 130° C. The mixtures of 26.2 g of glycidyl methacrylate, 32.4 g of butyl acrylate, 10 g of 2-hydroxyethyl acrylate and 1.5 g of tert-amyl perbenzoate in 30 g of methyl pentyl ketone are simultaneously added dropwise at 130° C. under nitrogen. The mixture is thereafter refluxed for 1 hour. The solution of the polymers is reacted, as described in Example 1, with 2-[2-hydroxy-3-tert-butyl-5-(2-carboxyethyl)phenyl]benzotriazole.

EXAMPLE 28

The polymer according to claim 28 is mixed in the ratio of 8.9:1 (based on solids content) with hardener HY 815 (ex CIBA-GEIGY), and the mixture is applied with a doctor blade to a white coil-coated aluminium sheet and dried at 60° C. for 30 minutes. After drying the finish is non-marring. The dry film thickness is ca. 40 μm.

What is claimed is:

1. A process for modifying acrylate copolymers by reacting a copolymer of glycidyl acrylate and/or glycidyl methacrylate and one or more alkyl acrylates or methacrylates and, if appropriate, styrene, (a) with a compound of formula I

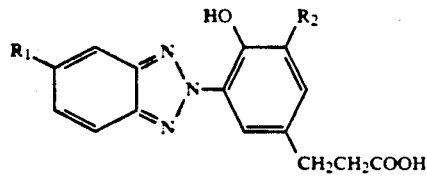

wherein $R_1$ is hydrogen or chloro and $R_2$ is $C_1$–$C_{12}$alkyl, and in an optional additional step (b) with a compound which contains an active hydrogen atom.

2. A process according to claim 1, wherein $R_1$ is hydrogen and $R_2$ is tert-butyl.

3. A process according to claim 1, wherein the alkyl moieties of the alkyl(meth)acrylates of the copolymer contain 1 to 8 carbon atoms.

4. A process according to claim 1, wherein the copolymer used for the reaction contains 10–50 mol % of glycidyl acrylate or glycidyl methacrylate.

5. A process according to claim 1, wherein 0.01 to 1 mol of the compound of formula I is used per mol of glycidyl groups.

6. A process according to claim 1, wherein 0.01 to 0.7 mol of the compound of formula I is used per mol of glycidyl groups.

7. A process according to claim 6, wherein the remaining glycidyl groups are reacted with an unsaturated fatty acid or with a mixture of fatty acids containing unsaturated fatty acids.

8. A modified acrylate copolymer obtained by the process as claimed in claim 1.

9. A binder for coating materials which contains a modified acrylate copolymer obtained by the process claimed in claim 1.

10. A binder according to claim 9, which contains a melamine resin or a polyisocyanate as crosslinking agent.

11. A binder for coating materials which contains a modified acrylate copolymer obtained by the process as claimed in claim 6 and still containing glycidyl groups, and, as crosslinking agent, a polyamine, a polyaminoamide, a di- or polycarboxylic acid anhydride, a polymer having carboxylic acid or carboxylic acid anhydride groups or a catalyst suitable for crosslinking epoxy resins.

12. A binder for air-drying coating materials which contains a modified acrylate copolymer prepared by the process as claimed in claim 7.

* * * * *